United States Patent [19]

Imaseki et al.

[11] Patent Number: 4,941,095
[45] Date of Patent: Jul. 10, 1990

[54] INTEGRATED FOUR-WHEEL STEER AND DIFFERENTIAL SLIP CONTROL SYSTEM

[75] Inventors: Takashi Imaseki; Yuji Kobari, both of Zushi, Japan

[73] Assignee: Nissan Motor Co., Ltd., Yokohama, Japan

[21] Appl. No.: 247,464

[22] Filed: Sep. 21, 1988

[30] Foreign Application Priority Data

Sep. 29, 1987 [JP] Japan .................. 62-245684

[51] Int. Cl.⁵ ............................... B62D 6/02
[52] U.S. Cl. .................. 364/424.05; 180/140; 280/91
[58] Field of Search ............ 364/424.05; 180/140, 180/141, 79.1; 280/91

[56] References Cited

U.S. PATENT DOCUMENTS

| | | | |
|---|---|---|---|
| 4,669,744 | 6/1987 | Sano et al. | 280/91 |
| 4,703,822 | 11/1987 | Kawamoto et al. | 180/140 |
| 4,716,981 | 1/1988 | Murao | 180/79.1 |
| 4,716,982 | 1/1988 | Ishii et al. | 180/140 |
| 4,719,981 | 1/1988 | Miyoshi | 180/140 |
| 4,768,603 | 9/1988 | Sugiyama et al. | 180/140 |

FOREIGN PATENT DOCUMENTS 62-103226 5/1987 Japan.
62-103227 5/1987 Japan.

Primary Examiner—Thomas G. Black
Attorney, Agent, or Firm—Foley & Lardner, Schwartz, Jeffery, Schwaab, Mack, Blumenthal & Evans

[57] ABSTRACT

A four-wheel steer control device has an actuator for actuating a set of steerable rear wheels for controlling the positions of the rear wheels by the operation of the actuator. A slip control device for a differential has a clutch for supplying a variable slip limiting force to the differential to limit a differential action thereof variably. An integrated control system controls the four-wheel steer control device and the slip control device in such a way that the rear wheels are correctively steered in the direction opposite to that of the front wheels at the time of cornering of the vehicle and when the slip limiting force is larger than a predetermined value and a cornering outside driving wheel speed is faster than a cornering inside driving wheel speed.

9 Claims, 4 Drawing Sheets

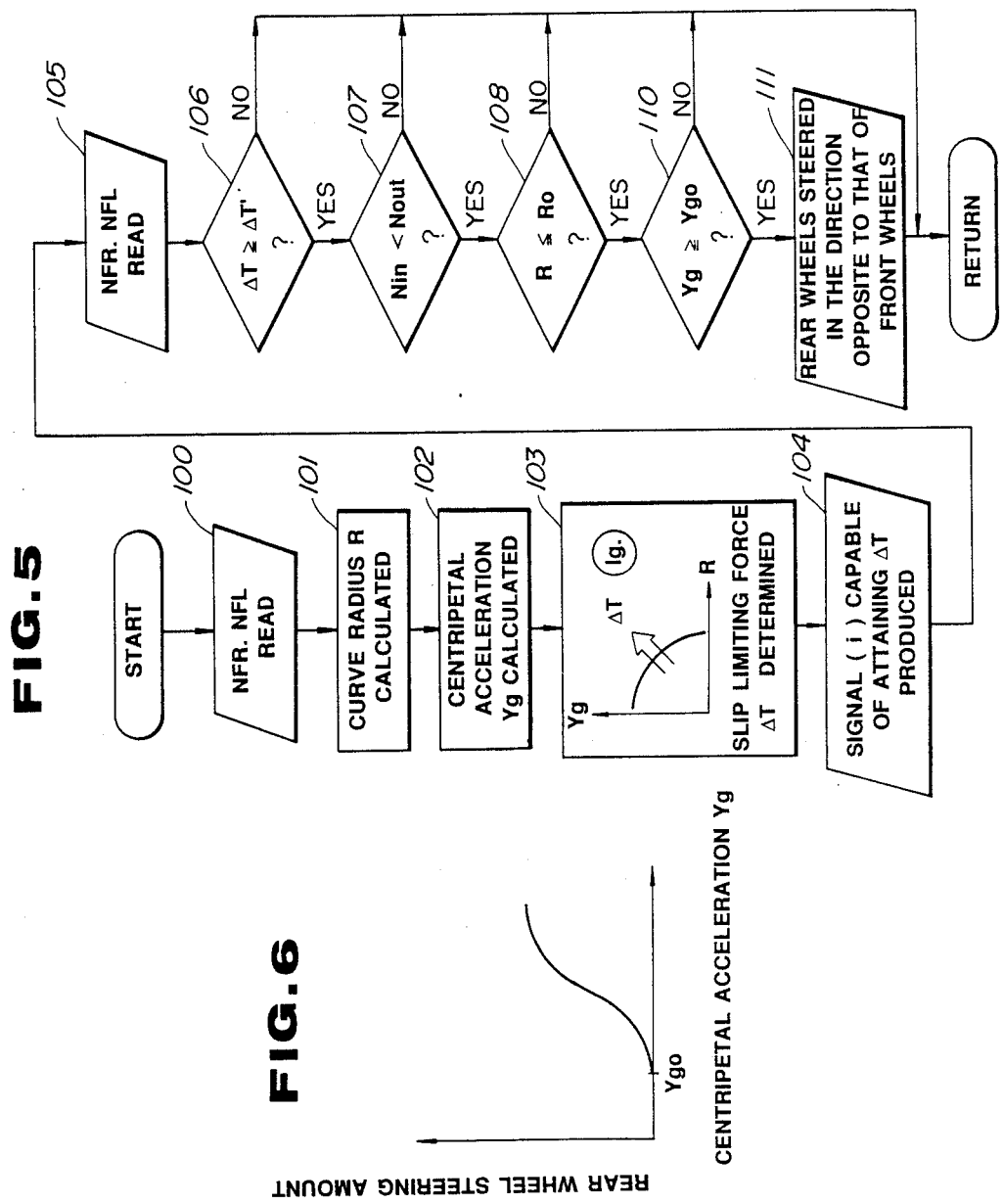

INTEGRATED FOUR-WHEEL STEER AND DIFFERENTIAL SLIP CONTROL SYSTEM

BACKGROUND OF THE INVENTION

1. Field of the Invention

The present invention relates in general to a wheeled vehicle equipped with a four-wheel steer control device and a slip control device for a differential, and more particularly to an integrated control system for a four-wheel steer control device and a slip control device for a differential.

2. Description of the Prior Art

A known slip control device for a differential includes a hydraulically operated friction clutch unit which is variably engaged for varying a differential action as disclosed in Japanese Provisional Patent Publication Nos. 62-103226 and 62-103227.

In order to retain a sufficient supply of a driving force to the driving wheels during cornering of the vehicle, it is desirable for the friction clutch unit to be engaged more strongly, i.e., it is desirable to increase a slip limiting force (i.e., a force supplied to the friction clutch unit to limit a slip thereof and therefore a differential action) during cornering of the vehicle.

When the slip limiting force is maintained high, it becomes possible to drive the vehicle in a power slide running state where a vehicle is subjected to a high lateral acceleration.

However, in a vehicle equipped with a four-wheel steer control device in addition to the above described slip control device, the slip limiting force control by the slip control device and the rear wheel steer control by the four-wheel steer control device are performed independently and have no relation to each other.

On the other hand, in case where the slip limiting force is maintained high during cornering of the vehicle and the driving wheels are held in contact with the ground so that the cornering outside driving wheel rotates at a speed higher than the cornering inside driving wheel, the vehicle is subjected to a moment causative of an understeer.

Accordingly, in case the rear wheels are steered in the same direction as that of the front wheels at the very time when the vehicle is subjected to a moment causative of an understeer, the force urging the rear wheel side vehicle body portion toward the center of the cornering curve is increased, thus further increasing the intensity of understeer.

SUMMARY OF THE INVENTION

In accordance with the present invention, there is provided a method of controlling a four-wheel steer and a differential slip for a wheeled vehicle. The vehicle has a set of steerable rear driving wheels, a differential interposed between the rear wheels, clutch means for supplying a slip limiting force to the differential to limit a differential action thereof and actuator means for actuating the rear wheels. The method comprises judging whether the slip limiting force is equal to or larger than a predetermined value during cornering of the vehicle and judging whether a cornering outside driving wheel speed is faster than a cornering inside driving wheel speed and correctively steering the rear driving wheels in the direction opposite to that of the front wheels when the slip limiting force is equal to or larger than a predetermined value and the cornering outside driving wheel speed is faster than the cornering inside driving wheel speed.

In accordance with the present invention, there is also provided an integrated four-wheel steer and differential slip control system for a wheeled vehicle which comprises a set of steerable rear driving wheels, a differential interposed between the rear wheels, clutch means for supplying a slip limiting force to the differential to limit a differential action thereof, actuator means for actuating the rear wheels and control means for controlling the clutch means and the actuator means in such a way that the rear wheels are correctively steered in the direction opposite to that of front wheels at the time of cornering of the vehicle and when the slip limiting force is equal to or larger than a predetermined value and a cornering outside driving wheel speed is faster than a cornering inside driving wheel speed.

The above method and system are effective for solving the problems inherent in the prior art device.

It is accordingly an object of the present invention to provide an integrated four-wheel steer and differential slip control system which can reduce, during cornering of the vehicle, the intensity of understeer without reducing the driving force supplied to the driving wheels.

It is another object of the present invention to provide an integrated four-wheel steer and differential slip control system of the above described character which can improve the controllability without reducing the driveability of the vehicle.

It is a further object of the present invention to provide an integrated four-wheel steer and differential slip control system which makes it possible to drive the vehicle safely even during high-speed cornering of the vehicle.

It is a further object of the present invention to provide an integrated four-wheel steer and differential slip control system of the above described character which can sufficiently supply a driving force to the driving wheels without deteriorating the controllability of the vehicle.

It is a further object of the present invention to provide an integrated four-wheel steer and differential slip control system of the above described character which is desirable and useful from the safety driving point of view.

It is a further object of the present invention to provide a novel method of controlling a four-wheel steer and a differential slip which is of the above described character.

BRIEF DESCRIPTION OF THE DRAWINGS

FIG. 5 is a flow chart depicting a variation of a control routine for the controller of FIG. 3; and FIG. 6 is a graph depicting a relation between a centripetal acceleration and a rear wheel steer.

DESCRIPTION OF THE PREFERRED EMBODIMENTS

Figure 1:
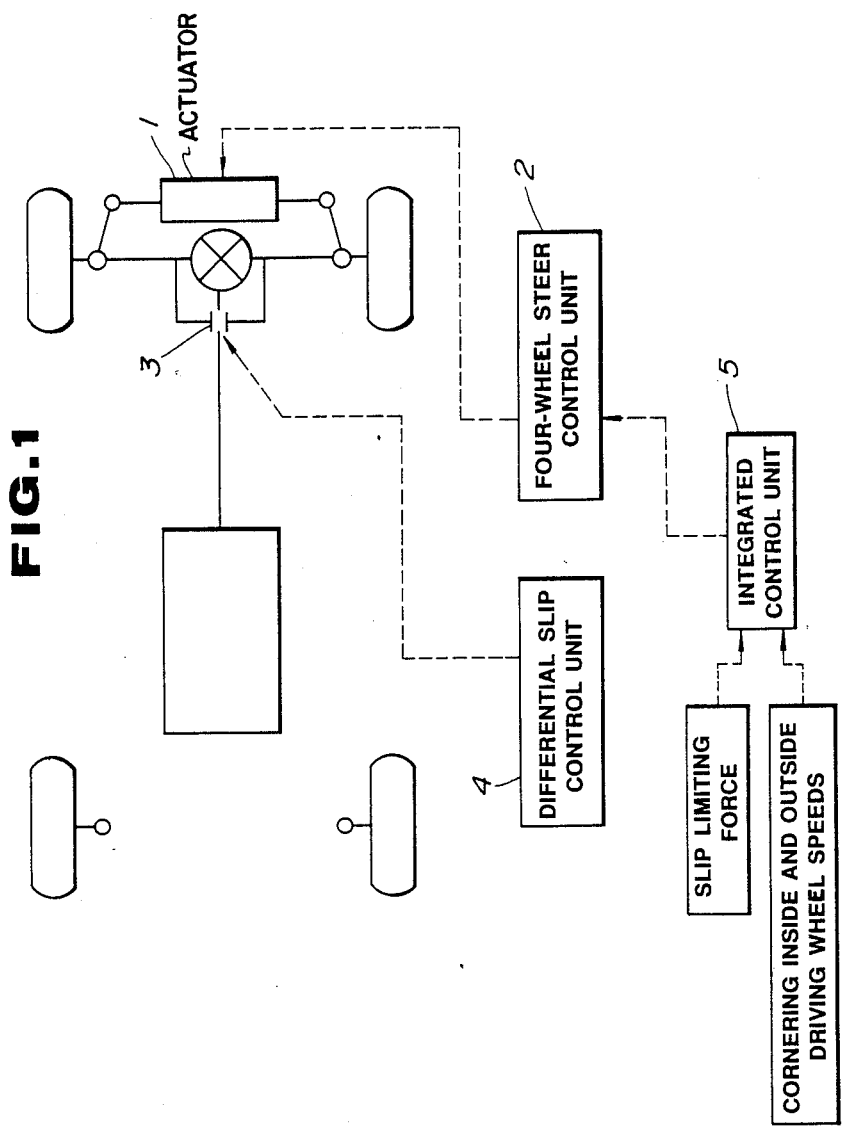
FIG. 1 is a diagramatic view of an integrated four-wheel steer and differential slip control system according to an embodiment of the present invention.

Referring first to FIG. 1, a vehicle is shown as being provided with an actuator 1 operative to steer a set of rear driving wheels (no numeral), a four-wheel steer control unit 2 operative to control the steering angle of the rear wheels by controlling the operation of the actuator 1, a clutch unit 3 operative to produce a slip limiting force for limiting a differential action between the driving wheels and a slip control unit 4 for a differential operatively connected with the clutch unit 4 for variably controlling the slip limiting force. The vehicle is further provided with an integrated four-wheel steer and differential slip control unit 5 operative to produce a signal when the slip limiting force during cornering of the vehicle is larger than a predetermined value and the cornering outside driving wheel speed is faster than the cornering inside driving wheel speed, which signal is supplied to the four-wheel steer control unit 2 for steering, by the operation of the actuator 1, the driving wheels in the direction opposite to that of the front wheels.

In operation, when the slip limiting force is larger than a predetermined value and the cornering outside driving wheel speed is faster than the cornering inside driving wheel speed, the integrated four-wheel steer and differential slip control unit 5 produces a signal and supplies it to the four-wheel steer control unit 4 which in turn actuates the rear wheel actuator 1 such that the rear wheels are steered in the direction opposite to that of the front wheels.

Accordingly, in case, during cornering of the vehicle, the slip limiting force is maintained large and the cornering outside driving wheel speed is faster than the cornering inside driving wheel speed thus subjecting the vehicle body to a moment causative of an understeer, the rear wheels are steered in the direction opposite to that of the front wheels, whereby to increase a yaw rate that serves as a moment causative of an oversteer and allow it to offset the aforementioned moment causative of an understeer and thereby make it possible to reduce the intensity of understeer without reducing the driving force supplied to the driving wheels.

Figure 2:
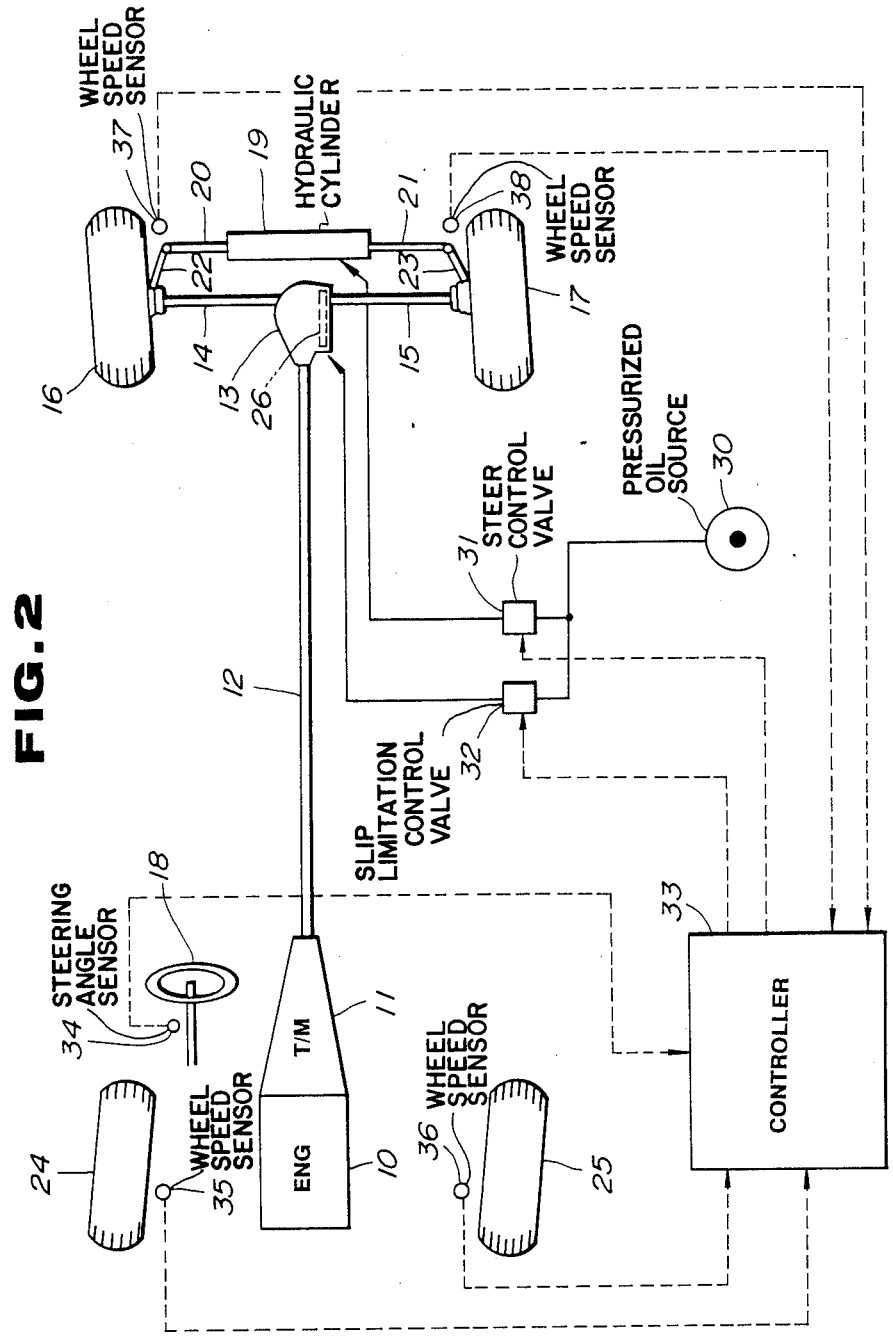
FIG. 2 is a schematic view of a front engine-rear drive vehicle incorporating an integrated four-wheel steer and differential slip control system according to another embodiment of the present invention.
Figure 3:
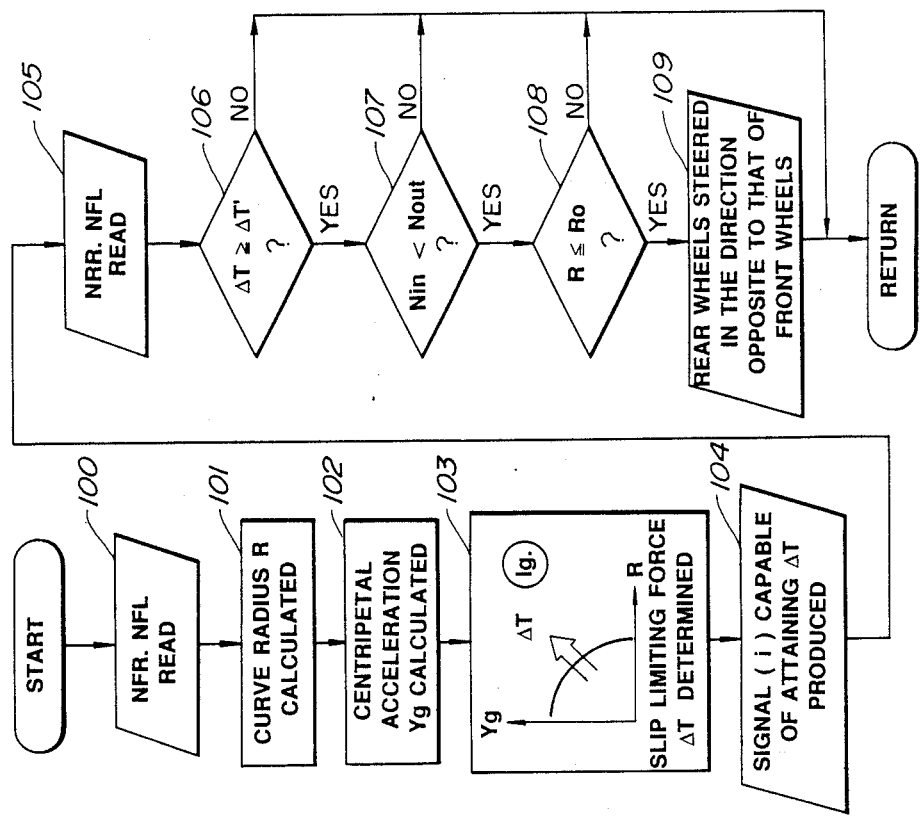
FIG. 3 is a flow chart depicting a control routine of a controller employed in the integrated control, system of FIG. 2.
Figure 4:
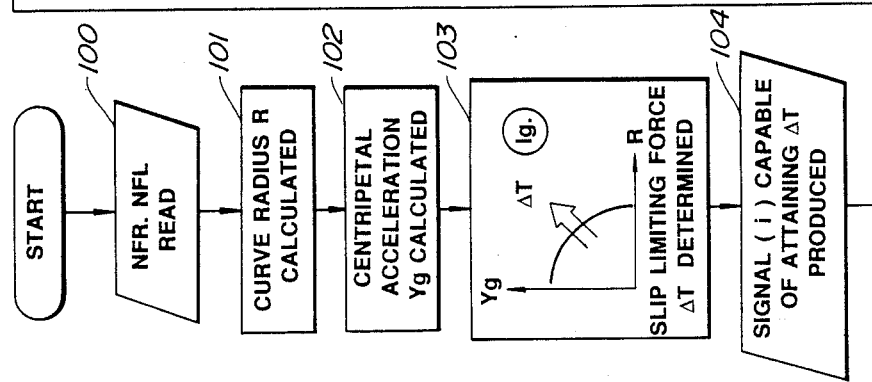
FIG. 4 is a graph depicting a relation between a cornering curve and a rear wheel steer.

Referring to FIGS. 2 to 4, an integrated four-wheel steer and differential slip control system according to another embodiment of the present invention is shown as being applied to a front engine-rear drive vehicle which is provided with an engine 10, transmission 11, propeller shaft 12, differential 13, drive axles 14 and 15, rear wheels 16 and 17, steering wheel 18, hydraulic cylinder 19 for steering the rear wheels 16 and 17 (rear wheel steering actuator), side rods 20 and 21, rear wheel steering linkages 22 and 23 and front wheels 24 and 25.

Four-wheel steer control is performed by controlling a pressurized oil of a pressurized oil source 30 which is supplied through a control valve 31 to the hydraulic cylinder 19. A slip limiting clutch unit 26 (e.g., an hydraulically operated multiple disk wet clutch unit) is incorporated in the differential 13. The slip limiting force $\Delta T$ for limiting the differential action between the rear wheels 16 and 17 is controlled by controlling the pressurized oil of the pressurized oil source 30 which is supplied through a control valve 32 to the clutch unit 26 incorporated in the differential 13.

The rear wheel steer control valve 31 and the slip limitation control valve 32 are controlled by a controller 33 which consists of an electric circuit responsive to signals from front wheel speed sensors 35 and 36, rear wheel speed sensors 37 and 38 and a steering angle sensor 34. That is, the front wheel speed sensors 35 and 36 detect the rotation speeds of the front wheels 24 and 25 and supply signals representing the detected rotation speeds of the front wheels 24 and 25 to the controller 33. On the other hand, the rear wheel speed sensors 37 and 38 detect the rotation speeds of the rear wheels 16 and 17 and supply signals representing the detected rotation speeds of the rear wheels 16 and 17 to the controller 33. The steering angle sensor 34 detects a steering angle and supplies a signal representing the detected steering angle to the controller 33.

The signal produced by the steering angle sensor 34 to represent the detected steering angle is used as an input information for the four-wheel steer control. The signals produced by the left and right front wheel speed sensors 35 and 36 (when viewed from the front of the vehicle) to represent the left and right front wheel speeds NFL and NFR are used for obtaining an input information (curve radius R, centripetal acceleration Yg) for the slip limiting force control and an input information (vehicle speed V) for the four-wheel steer control. On the other hand, the signals produced by the left and right rear speed sensors 37 and 38 to represent the left and right rear wheel speeds NRL and NRR are used for obtaining an input information for the integrated control, i.e., used for discriminating the cornering inside wheel and the cornering outside wheel and also for detecting the cornering inside rear wheel speed Nin and the cornering outside rear wheel speed Nout.

The operation will now be described hereinlater.

Referring to the flow chart of FIG. 3 depicting the control routine of the controller 32, at step 100 the left front wheel speed NFL and the right front wheel speed NFR are read and at step 101 the curve radius R of the cornering vehicle is calculated whilst at step 102 the centripetal acceleration Yg of the cornering vehicle is calculated.

Assuming that V is a running speed of a vehicle and $\psi$ is a yaw rate, the curve radius R and the centripetal acceleration Yg of the cornering vehicle are calculated by using the following expressions.

$$V = \{(NFL + NFR)/2\}/r$$
$$= K1 \cdot |NFL + NFR|$$
$$R = V/\psi$$
$$= K2 \cdot |(NFL + NFR)/(NFL - NFR)|$$
$$Yg = V^2/R$$
$$= K3 \cdot |(NFL + NFR) \times (NFL - NFR)|$$

where K1, K2, K3 are constants which are determined depending on the specification of the associated vehicle and r is a radius of a tire.

At step 103, the slip limiting force $\Delta T$ is determined based on the curve radius R and the centripetal acceleration Yg which are determined at steps 101 and 102 and on a predetermined control map.

At step 104, a valve drive signal (i) is supplied to the slip limitation control valve 32 for controlling supply of a pressurized oil and thereby allowing the slip limiting clutch 26 to produce the aforementioned slip limiting force $\Delta T$.

At step 105, the left rear wheel speed NFL and the right rear wheel speed NRR are read.

At step 106, it is judged whether the slip limiting force ΔT obtained at step 103 to serve as a command value is equal to or larger than a predetermined value ΔTo.

At step 107, the cornering inside rear wheel and the cornering outside rear wheel are discriminated based on the left and right rear wheel speeds NRL and NRR (i.e., at the initial period of vehicle cornering where lifting of the cornering inside wheel does not yet occur, the inside and outside rear wheels are discriminated by reference to the relation of Nin<Nout) whilst at the same time it is judged which one of the cornering inside wheel speed Nin and the cornering outside wheel speed Nout is faster.

In the meantime, when lifting of the inside wheel occurs, the relation of Nin>Nout is obtained, thus allowing a larger driving force to be distributed to the cornering outside wheel and therefore changing the vehicle cornering characteristic into an oversteer.

At step 108, it is judged whether the curve radius R obtained at step 101 is equal to or smaller than a predetermined value Ro.

Only when judgements at steps 106 to 108 are all YES, the control proceeds to step 109 where such a signal is produced that causes the rear wheels 16 and 17 to be correctively steered in the direction opposite to that of the front wheels and by the amount (FIG. 4) that is obtained based on the curve radius R.

When any one of the judgements at steps 106 to 108 is NO, a normal four-wheel steer control is effected.

In the foregoing, it is to be noted that even during cornering of the vehicle and when the slip limiting force ΔT is larger than the predetermined value ΔTo with the cornering outside driving wheel speed Nout being faster than the cornering inside driving wheel speed Nin, the controller 33 produces a signal that causes the rear wheels 16 and 17 to be steered in the direction opposite to that of the front wheels 24 and 25.

Accordingly, when the slip limiting force ΔT is large and both of the rear wheels 16 and 17 are held in contact with the road thereby allowing the outside driving wheel speed Nout to be faster than the inner driving wheel speed Nin and therefore allowing the driving force to cause a moment that urges the vehicle toward the understeer (i.e., a moment causative of an understeer), the rear wheels 16 and 17 are correctively steered in the direction opposite to that of the front wheels 24 and 25, whereby the yaw rate ψ that is causative of an oversteer is increased and allowed to offset the aforementioned moment causative of an understeer, thus making it possible to reduce the intensity of understeer without reducing the driving force.

Further, the rear wheels 16 and 17 are steered in the direction opposite to that of the front wheels 24 and 25 when the curve radius R is equal to or smaller than the predetermined value Ro (R≦Ro). For this reason, when the curve radius R is larger than the predetermined value Ro, the rear wheels 16 and 17 are not steered in the direction opposite to that of the front wheels 24 and 25, thus allowing the vehicle to be held in a state of an understeer. This is because during cornering of the vehicle along a large curve an understeer is more desirable since it gives a driver a sense of assurance.

Further, as shown in FIG. 4, the degree of steering of the rear wheels is variably controlled depending on the curve radius R. By this, when the curve radius R is in the zone in which it is smaller than a predetermined value Ro, an intensity of understeer is maintained substantially constant independently of the magnitude of the curve radius R, thus making it possible to increase the cornering stability or controllability.

While the present invention has been described and shown as above, it is not limitative. For example, while it has been described and shown to steer the rear wheels in the direction opposite to that of the front wheels under the condition that ΔT≧ΔTo, Nin<Nout and R≦Ro as shown in FIG. 3, the above described steering may further require an additional condition that the centripetal acceleration Yg is equal to or larger than a predetermined value Ygo (Yg≧Ygo) such that in the zone in which the centripetal acceleration Yg is smaller than a predetermined value Ygo the vehicle may have a tendency of understeer. Further, the rear wheel steering amount may be determined based on the centripetal acceleration Yg as shown in FIG. 6.

Further, while the rear wheels have been described and shown as being normally held in their neutral positions and steered in the direction opposite to that of the front wheels, the rear wheels may otherwise be steered to their neutral positions (i.e., straight ahead positions) in response to detection of the following condition when they are already steered in the same direction as that of the front wheels before detection of the condition that during cornering of the vehicle the slip limiting force is larger than a predetermined value and the outside driving wheel speed is faster than the inside driving wheel speed. That is, by detection of the above described condition the rear wheels may be steered in the direction opposite to that of the front wheels and moved into their neutral positions.

Further, while the four-wheel steer control and the differential slip control have been described and shown as being performed by using a hydraulic pressure, they may otherwise be performed by any other means such as an electric motor for steering the rear wheels and a magnetic force for producing a slip limiting force.

What is claimed is:

1. A method of controlling a four-wheel steer and a differential slip for a wheeled vehicle, the vehicle having a set of steerable rear driving wheels, a differential interposed between the rear wheels, clutch means for supplying a slip limiting force to the differential to limit a differential action thereof and actuator means for actuating the rear wheels, the method comprising:

detecting a vehicle cornering condition and determining a slip limiting force based on a detected vehicle cornering condition;

judging whether the slip limiting force is equal to or larger than a predetermined value during cornering of the vehicle;

obtaining a cornering outside driving wheel speed and a cornering inside driving wheel speed based on the detected vehicle cornering condition;

judging whether the cornering outside driving wheel speed is faster than the cornering inside driving wheel speed; and correctively steering the rear driving wheels in the direction opposite to that of the front wheels when the slip limiting force is equal to or larger than the predetermined value and the cornering outside driving wheel speed is faster than the cornering inside driving wheel speed.

2. A method as set forth in claim 1, further comprising judging whether a cornering curve radius is equal to or smaller than a second predetermined value, the corrective steering being performed, in addition to the condition, when the curve radius is equal to or smaller than the second predetermined value.

3. A method as set forth in claim 2, further comprising judging whether a centripetal acceleration of a cornering vehicle is equal to or larger than a third predetermined value, the corrective steering being performed, in addition to the said conditions, when the centripetal acceleration is equal to or larger than the third predetermined value.

4. A method as set forth in claim 3, further comprising determining the amount of said steering based on the centripetal acceleration.

5. A method as set forth in claim 1 wherein the slip limiting force is determined by the steps of:
   detecting rotation speeds of the front wheels;
   calculating a curve radius of the cornering vehicle using the rotation speeds of the front wheels;
   a centripetal acceleration of the cornering vehicle using the rotation speeds of the front wheels; and
   determining the slip limiting force based on the curve radius and the centripetal acceleration of the cornering vehicle and on a predetermined map.

6. A method as set forth in claim 5 wherein the cornering outside driving wheel speed and the cornering inside driving wheel speed are obtained by the steps of:
   detecting rotation speeds of the rear wheels; and
   discriminating the cornering outside driving wheel and the cornering inside driving wheel based on detected rear wheel speeds and on comparing the cornering outside driving wheel speed with the cornering inside driving wheel speed at the initial period of cornering when the cornering inside driving wheel is held in contact with the road.

7. An integrated four-wheel steer and differential slip control system for a wheeled vehicle, said control system comprising:
   a set of steerable rear driving wheels;
   a differential interposed between said rear driving wheels;
   clutch means for supplying a variable slip limiting force to said differential to variably limit a differential action thereof in response to variation of a vehicle cornering condition;
   actuator means for actuating said rear driving wheels;
   detecting means for detecting said vehicle cornering condition; and
   control means for controlling, based on a detected vehicle cornering condition, said clutch means and said actuator means such that said rear driving wheels are correctively steered in a direction opposite to that of steerable front wheels at a time of cornering of said vehicle and when said slip limiting force is equal to or larger than a predetermined value and a cornering outside driving wheel speed is faster than a cornering inside driving wheel speed.

8. An integrated four-wheel steer and differential slip control system for a wheeled vehicle, said control system comprising:
   a set of steerable front wheels;
   a set of steerable rear driving wheels;
   a differential interposed between said rear driving wheels;
   four-wheel steer control means having an actuator for actuating said rear driving wheels for controlling positions of said rear driving wheels by operation of said actuator;
   slip control means having a clutch unit for supplying a variable slip limiting force to said differential to variably limit a differential action thereof in response to variation of a vehicle cornering condition;
   detecting means for detecting said vehicle cornering condition; and
   integrated control means for controlling, based on a detected vehicle cornering condition, said four-wheel steer control means and said slip control means such that said rear driving wheels are correctively steered in a direction opposite to that of said front wheels at a time of cornering of said vehicle and when said slip limiting force is larger than a predetermined value, a cornering outside driving wheel speed is faster than a cornering inside driving wheel speed and a cornering curve radius is equal to or smaller than a second predetermined value.

9. In a vehicle having a set of steerable front wheels, a set of steerable rear driving wheels and a differential interposed between said rear driving wheels, an integrated four-wheel steer and differential slip control system comprising:
   a pressurized oil source;
   a hydraulic clutch incorporated in said differential and communicable with said pressurized oil source for supplying a slip limiting force to said differential to limit a differential action thereof;
   a first control valve interposed between said pressurized oil source and said hydraulic clutch for controlling a supply of pressurized oil from said pressurized oil source to said hydraulic clutch and thereby variably control said slip limiting force in response to variation of a vehicle cornering condition;
   a hydraulic cylinder for steering said rear driving wheels;
   a second control valve interposed between said pressurized oil source and an actuator for controlling supply of pressurized oil from said pressurized oil source to said cylinder and thereby control steering of said rear driving wheels;
   a set of first sensors for detecting rotation speeds of said front wheels, respectively;
   a set of second sensors for detecting rotation speeds of said rear driving wheels, respectively;
   a third sensor for detecting a steered angle of said front wheels; and
   a controller having means for judging whether said slip limiting force is larger than a predetermined value and whether or cornering outside driving wheel is faster than a cornering inside driving wheel using detected front wheel speeds and rear driving wheel speeds and controlling, based on a detected steered angle of said front wheels, said first and second control valves such that said rear driving wheels are correctively steered in a direction opposite to that of said front wheels at a time of cornering of said vehicle and when said slip limiting force is equal to or larger than said predetermined value, a cornering outside driving wheels speed is faster than a cornering inside driving wheel speed, a cornering curve radius to equal to or smaller than a second predetermined value and a centripetal acceleration of said cornering vehicle is equal to or larger than a third predetermined value.

* * * * *